United States Patent
Cherian

(12) 
(10) Patent No.: US 6,493,745 B1
(45) Date of Patent: Dec. 10, 2002

(54) MESSAGE PROCESSING TECHNIQUE TO IMPROVE CLIENT COMPUTER RESPONSE TO USER INPUT

(75) Inventor: Vinoo Cherian, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/389,816

(22) Filed: Sep. 3, 1999

(51) Int. Cl.[7] ............................................... G06F 13/00
(52) U.S. Cl. ...................................................... 709/206
(58) Field of Search ................................. 709/200, 206, 709/207, 225, 1, 101, 102, 106; 707/3; 712/200, 202, 205, 206

(56) References Cited

U.S. PATENT DOCUMENTS

| | | | | |
|---|---|---|---|---|
| 5,544,051 A | * | 8/1996 | Semn et al. | 707/3 |
| 5,875,302 A | * | 2/1999 | Obhan | 709/225 |
| 6,385,644 B1 | * | 5/2002 | Devine et al. | 709/206 |

* cited by examiner

*Primary Examiner*—Robert B. Harrell
(74) *Attorney, Agent, or Firm*—Merchant & Gould P.C.

(57) ABSTRACT

A main processing thread in a handheld computer processes user input messages and e-mail messages. A second thread is created from the main thread. The main thread has a user input queue for user input messages, and the second thread having a notification queue for e-mail notification messages. The user input messages in the user input queue are processed until the user input queue is empty. A notification send ON signal is sent from the main thread to the second thread after the user input queue is empty. The notification send ON signal indicates when the main thread is available to process e-mail notification messages. The main thread retrieves and processes e-mail notification messages sent from the second thread after the notification send ON signal has been sent from the main thread until the user input queue is no longer empty. When the user input queue is no longer empty, a notification send OFF signal is sent from the main thread, and user input messages are processed by the main thread.

21 Claims, 6 Drawing Sheets

MESSAGE PROCESSING TECHNIQUE TO IMPROVE CLIENT COMPUTER RESPONSE TO USER INPUT

FIELD OF THE INVENTION

This invention relates to a technique for processing messages to improve response by handheld computer to user input. More particularly the invention relates to managing the processing to handle user input and messages received by a handheld computer from a server computer in a manner such that processing of user input is not delayed as perceived by the user.

BACKGROUND OF THE INVENTION

Handheld computers, such as handheld personal computers or palm-sized computers are now used to communicate with desktop personal computers or server computers to exchange information and records. Typically, the handheld computers are used to handle personal information management functions such as e-mail, calendars, to-do lists, phone or personal contact lists, notes, etc. One of the most active uses is the management of e-mail, particularly by exchanging e-mail between server computer and handheld computer.

Because of the limitations in hardware and software of the handheld computer and some other personal computers, such computers when operating as client computers to a server computer have operative or performance limitations. Some of these performance limitations are particularly visible by the user.

In the handheld computer, E-Mail messages (data notification) have a priority for processing that is higher than the priority assigned to user interface device (keyboard & mouse) messages. In the past, during massive E-mail downloads, the handheld computer would not respond, or be very slow to respond, to user key strokes or mouse commands until the e-mail download was complete. The e-mail download having a higher priority than user input would lock out the processing of user interface commands. From the perspective of the user, the handheld computer appears slow or locked-up. In effect, there is a problem of system lockout or inability of the user to interface with the handheld computer during massive E-Mail message down loads.

SUMMARY OF THE INVENTION

In accordance with this invention, the above and other performance problems on small or handheld computers are solved by a method for managing in a main processing thread in a handheld computer user input messages and e-mail messages. A second thread is created from the main thread. The main thread has a user input queue for user input messages, and the second thread has a notification queue for e-mail notification messages. The method then processes the user input messages in the user input queue until the user input queue is empty. A sending step passes a notification send signal from the main thread to the second thread after the user input queue is empty. The notification send signal indicates when the main thread is available to process e-mail notification messages. The main thread retrieves and processes e-mail notification messages sent from the second thread after the notification send signal has been sent from the main thread until the user input queue is no longer empty.

In another aspect of the invention, the invention is implemented as apparatus for preventing a perception to a user of slow processing or system lockout by a client computer due to extended delay in processing a local item while the client computer processes a server-based item. The apparatus has a notification module and a main processing module. The notification module has a server-based item notification queue storing notices of changes in server-based items awaiting processing. A main processing module processes local items and toggles ON/OFF a notification send signal to the notification module. The notification send signal is toggled ON, when all local items have been processed, and is toggled OFF when local items are waiting to be processed. The notification module sends notification messages to the main processing module for processing, when the notification send signal is toggled ON, and stores notices of changes in the notification queue when the notification send signal is toggled OFF.

In another aspect of the invention, the invention is implemented as a computer program storage medium readable by a computing system and encoding a computer program of instructions for executing a computer process in a client computer. The computer process manages the priority of handling user input messages and server-based item messages from a server computer. The computer process begins by opening a first thread for processing user input messages and server-based item messages. The first thread has a user input queue for user input messages. A second thread is opened to hold server-based items for processing by the first thread. The second thread has an item queue for server-based item messages. The process continues by retrieving for the first thread the user input messages from the user input queue until the user input queue is empty. A send condition is set to ON when the user input queue is empty and reset to OFF when the user input queue is not empty. The process sends a server-based item message from the item queue in the second thread to the first thread when the send condition is ON. The first thread processes the user input messages from the user input queue and the server-based item messages from the item queue whereby the user input messages are processed before the server-based item messages are processed.

In a further aspect of the invention a computer data signal embodied in a carrier wave readable by a computing system encodes a computer program of instructions to execute a computer process for controlling the priority of processing of first and second messages in a client computer. The computer process has an establishing operation, a holding operation, a toggling operation and a processing operation. First and second queues are established for the first and second messages respectively. The second queue holds the second messages until a retrieve condition is toggled ON. The toggling operation toggles the retrieve condition ON and Off depending on whether the first queue is empty or not empty, respectively. The processing operation processes first messages from the first queue and second messages from the second queue depending upon whether the retrieve condition is OFF or ON, respectively.

A more complete appreciation of the present invention and its scope may be obtained from the accompanying drawings, which are briefly described below, and from the following detailed description of presently preferred embodiments of the invention and from the appended claims.

DETAILED DESCRIPTION OF THE INVENTION

To implement the preferred embodiment of the invention, the first operation is the creation of a secondary thread in addition to the main thread of the software. The main thread handles user input messages, and works with database software to handle e-mail messages in database folders. The secondary thread communicates with the database software and instructs the database to send all data notification messages to a queue for the secondary thread. Interface device, or user input, messages continue to be processed solely through the main thread. Notification messages are passed to the main thread for processing when there are no interface device messages awaiting processing in the main thread.

In operation, after a handheld computer has been connected to a server, the system retrieves and stores e-mail notification messages in the queue of the secondary thread. If the user communicates with the system via its interface device during the download of notification messages, the interface device messages generated from such communication are stored in the queue of the main thread. The system processes messages stored in the main thread queue on a first in first out basis. Data notification messages stored in the queue of the secondary are not processed until the main thread queue is empty.

Upon emptying the main thread queue, the main thread sends a message to the secondary thread to send data notification messages stored in the queue of the secondary thread to the main thread to be processed. The main thread loops between processing of interface device messages and e-mail notification messages until the notification messages have all been down loaded. In this scheme, interface device messages are always processed before e-mail notification messages. This ensures that the interface device (mouse & keyboard) messages are processed in a timely fashion during large e-mail downloads.

Figure 1:
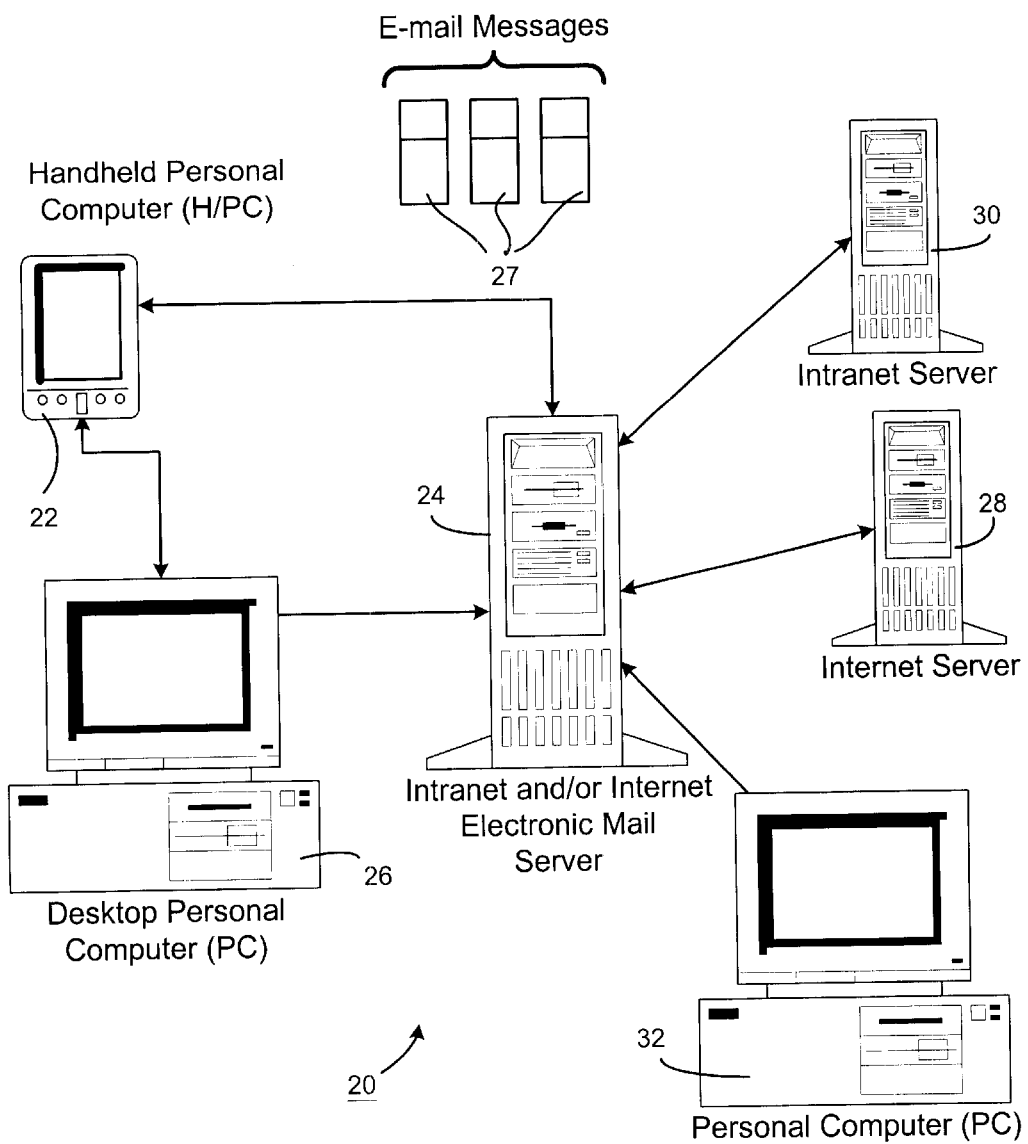
FIG. 1 is a pictorial representation of an example client/server computer network environment in which the principles of the present invention may be applied.

In order to describe the present invention in detail, example environments in which the invention may be employed are described in connection with FIGS. 1–3. FIG. 1 illustrates an example client/server network environment in which the principles of the present invention may be applied. The client/server network system 20 includes a client computer system 22 that may be connected to a server computer system 24. In one embodiment, the client computer system 22 is a portable hand-held computer (H/PC) operating under the control of an operating system capable of carrying out the present invention. Examples of portable computers in which the present invention may be implemented include those that are commercially available as handheld personal computers, palm-size computers, and the like. The present invention is described in connection with handheld or other portable computers, as the invention is particularly useful when used in connection with these devices. However, the invention may be used in connection with other computing devices requiring synchronization, as will become readily apparent to those skilled in the art from the ensuing description of the invention.

The H/PC 22 may also be connected to a desktop personal computer (PC) 26 as a companion device, which in turn may be connected to the server 24. The server 24 represents a computing system capable of managing network traffic spanning various geographic areas (e.g., local, wide and global area networks) or operating under any particular network configuration. In the example of FIG. 1, the server 24 operates as an Internet server and/or an Intranet server to send and receive electronic items such as electronic mail messages (e-mail) 27. These electronic items may be routed through various connections or gateways to other computer systems such as an Internet e-mail server 28, an Intranet server 30 and/or another desktop PC 32. The server 24 receives e-mail messages from the other computing systems 28, 30 and 32 and stores these e-mail messages for the user of the H/PC 22 and the PC 26 in an account dedicated to that user.

The e-mail server communicates with the various computers 22, 26, 28, 30 and 32 using specific protocols, i.e., rules governing the type and form of communications. The e-mail server may communicate with the handheld computer 22 using, for example, the Post Office Protocol (POP), the Internet Message Access Protocol (IMAP), or some other message transport protocol. POP is relatively rudimentary and offers few operational features to the user. IMAP offers more features related to the communication between a client device and the network server device. POP and IMAP protocols are generally considered message receipt protocols used to allow a remote or companion device to receive messages, while the Simple Mail Transfer Protocol is an example of a protocol generally used to communicate messages from the remote or companion device to the server. The present invention may be used in connection with various transfer protocols.

The handheld computer 22 includes a messaging system that receives and stores server-based items, such as the e-mail messages 27. These server-based items are stored in a hierarchy of folders, where each top-level folder of the hierarchy is associated with the server that provides the corresponding server-based items. The messaging system is capable of handling messages in flat folder storage architectures as well as the newer hierarchical folder storage architectures.

Figure 2:
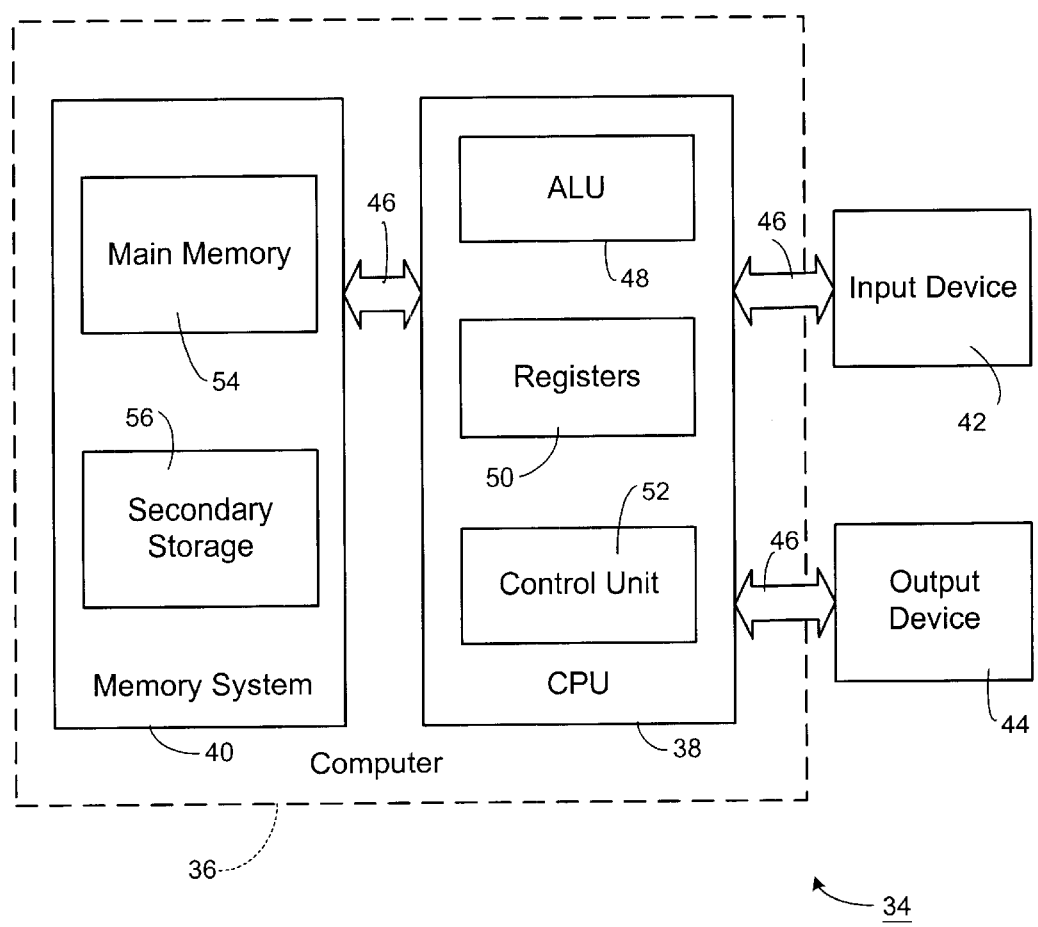
FIG. 2 shows one embodiment of a handheld computer system that may be used in connection with the present invention.

FIG. 2 provides a general description of an example computing environment in which the invention may be implemented. Various embodiments of the invention may be implemented by executing program instructions in this type of computing environment, such as the H/PC 22. Those skilled in the art will appreciate that the invention may be practiced with other computer system configurations, such as laptop PCs, desktop PCs, multiprocessor systems, microprocessor-based or programmable consumer electronics, network PCs, mini-computers, mainframe computers, and so forth.

The computing system 34 (e.g., H/PC) illustrated in FIG. 2 includes a computer 36 having at least one central processing unit (CPU) 38 with a memory system 40, an input device 42, and an output device 44. These elements are coupled by at least one system bus 46. The system bus 46 may be any of several types of bus structures such as a memory bus, a peripheral bus or a local bus using any of a variety of bus architectures. The CPU 38 is of familiar design and includes an Arithmetic Logic Unit (ALU) 50 for performing computations, a collection of registers for temporary storage of data and instructions, and a control unit 52 for controlling operation of the system 34. The CPU 38 may be a microprocessor having any of a variety of architectures including, but not limited to those architectures currently produced by Intel, Cyrix, AMD, IBM and Motorola.

The system memory 40 includes a main memory 54 which may include both volatile and non-volatile memory, such as random access memory (RAM) and read-only memory (ROM). The system memory 40 may also include secondary storage 56 in the form of long-term storage mediums such as hard disks, floppy disks, tape, compact disks (CDs), flash memory, and other devices that store data using electrical, magnetic, optical or other recording media. The main memory 54 may also include video display memory for displaying images through the output device 44, such as a display device. The memory can comprise a variety of alternative components having a variety of storage capacities such as magnetic cassettes memory cards, video digital disks, Bernoulli cartridges, random access memories, read-only memories and the like may also be used in the exemplary operating environment. Memory devices within the memory system and their associated computer readable media provide non-volatile storage of computer readable instructions, data structures, programs and other data for the computer system.

The input devices may include a keyboard, a mouse, a microphone, a touch pad, a touch screen, voice-recognition system, etc. The output devices may include a display, a printer, a speaker, a touch screen, etc. Some devices, such as a network interface or a modem can be used as input and/or output devices. The input and output devices are connected to the computer through system buses 46.

The computer system further includes an operating system and usually one or more application programs. The operating system comprises a set of programs that control the operation of the system 34, control the allocation of resources, provide a graphical user interface to the user and includes accessory and utility programs. An example of an operating system that can run on the handheld computer is the "WINDOWS CE" operating system, which also is commercially available from Microsoft Corporation. An application program is software that runs on top of the operating system software, and uses computer resources made available through the operating system to perform application-specific tasks desired by the user. While the present invention may be integrated into the operating system software, a preferred embodiment provides for its implementation in an application program as described more fully in connection with FIG. 3 below.

Figure 3:
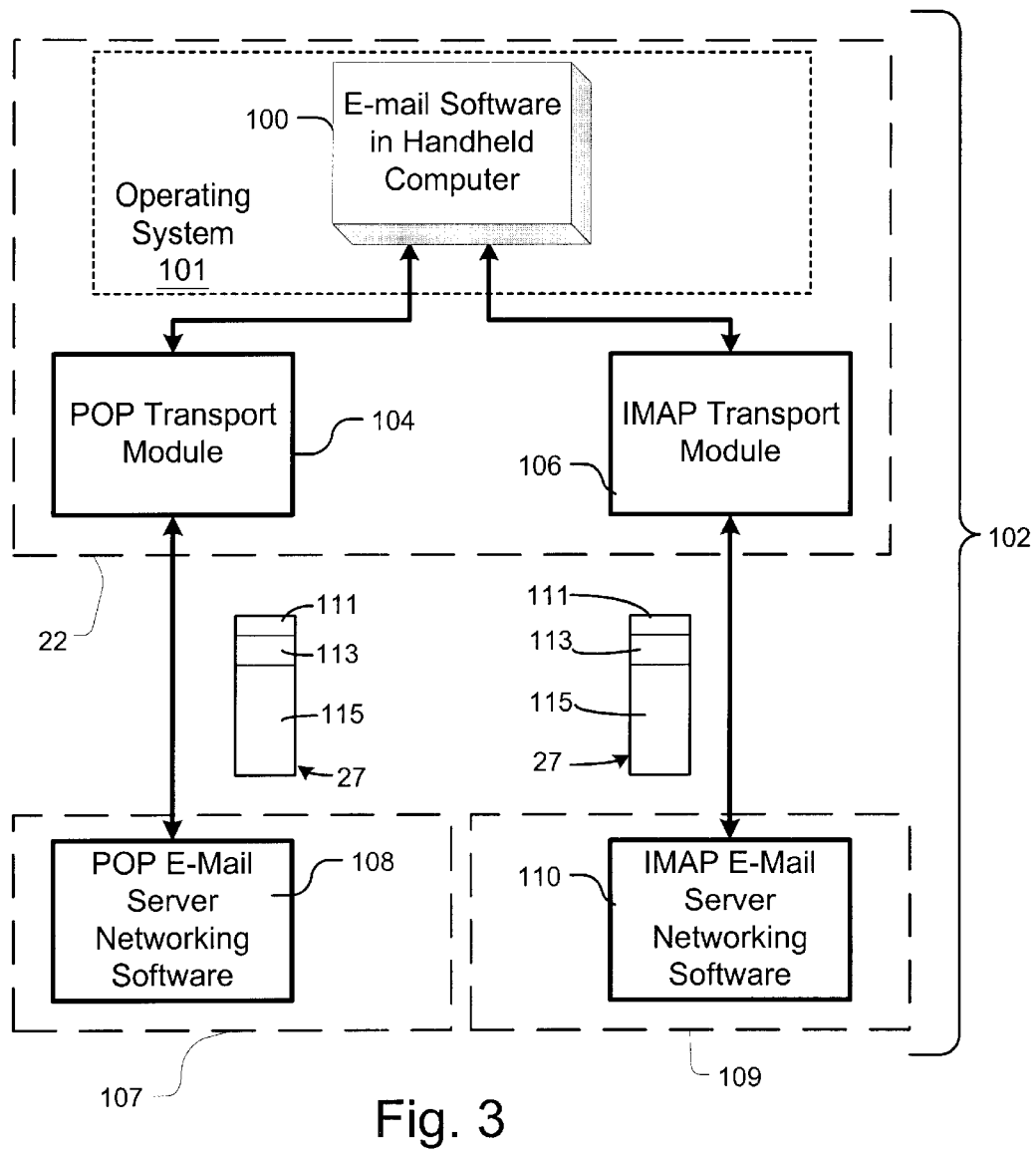
FIG. 3 shows one embodiment of a client/server software environment that includes e-mail software and transport modules capable of use in connection with the present invention.

FIG. 3 illustrates a software interface between the operating system and application programs and modules, in accordance with one embodiment of the present invention. In this embodiment, the e-mail software 100 is an application program that runs on top of an operating system 101, such as the Microsoft "WINDOWS CE" operating system used with the H/PC 22. The e-mail software 100 works directly with communication software known as transport modules. In the illustrated embodiment, one module is a POP transport module 104, and another is an IMAP transport module 106. The POP transport module 104 is a network communications program designed specifically to communicate with POP communications software 108 located on a POP e-mail server 107. POP server 107 represents a particular embodiment of the server 24 described in connection with FIG. 1. Alternatively, the e-mail software 100 communicates with the IMAP transport module 106, which is a network communication program designed to communicate with IMAP software 110 on the IMAP e-mail server 109. IMAP server 109 represents another embodiment of the server 24. Depending on whether the H/PC 22 is configured to communicate with server 107 or 109, transport module 104 or 106 is used. The user configures the H/PC 22 to communicate based on the user's particular e-mail account and the protocol employed by the e-mail server. However, with respect to the e-mail software 100, the requests, commands and responses are the same regardless of which transport module 104 or 106 is used.

The e-mail software 100 sends command requests to the transport module 104 or 106 requesting that actions be performed by the server 107 or 109. Such actions might be to return server-based items such as e-mail messages. When a request is received by the module 104 or 106, the module 104 or 106 converts the command into data signals that are sent to the e-mail server 107 or 109 over the network connection. The e-mail server 107 or 109 and its networking software 108 or 110 receives these data signals, compiles the signals, analyzes the signals and performs the requested operations in response to the signals. Once the server 107 or 109 performs the operations, the server returns information to the transport module 107 or 109 either acknowledging the operation was completed successfully, or that an error occurred.

The response from the server also includes data requested by the software 100. The response is in the form of data signals that are sent to the module 104 or 106. Module 104 or 106 in turn compiles the data signals into a meaningful response for transport to the e-mail software 100. The software 100 can then parse and use the response accordingly.

The subject of the requests from the software 100 to the server 107 or 109 relate to e-mail messages 27 (FIG. 1). Each e-mail message 27 is an electronic document that is made up of at least three elements: an identification element (ID) 111; header information 113; and a message body 115. The ID 111 is used internally by the handheld computer 22 or the server 24 to identify the file. It may be a simple identifier such as an integer, or may be more complex such as a file name or other ID string. The header 113 includes information regarding the e-mail message 27, such as the originator, addressee, creation time, and message subject. The header 113 may include other informational fields relating to the data or management thereof. The body 115 is the actual message created by the message originator, and may include text, graphics, other files or attachments.

In the following description, the logical operations of the various embodiments of the invention described herein may be implemented in a variety of manners, including a sequence of computer implemented steps running on a computing system, and/or interconnected machine modules within the computing system. The particular implementation used is a matter of choice dependent on the performance requirements of the hand-held computer and/or the server. Accordingly, the logical operations making up the embodiments of the invention are referred to alternatively as operations, steps or modules.

Figure 4:
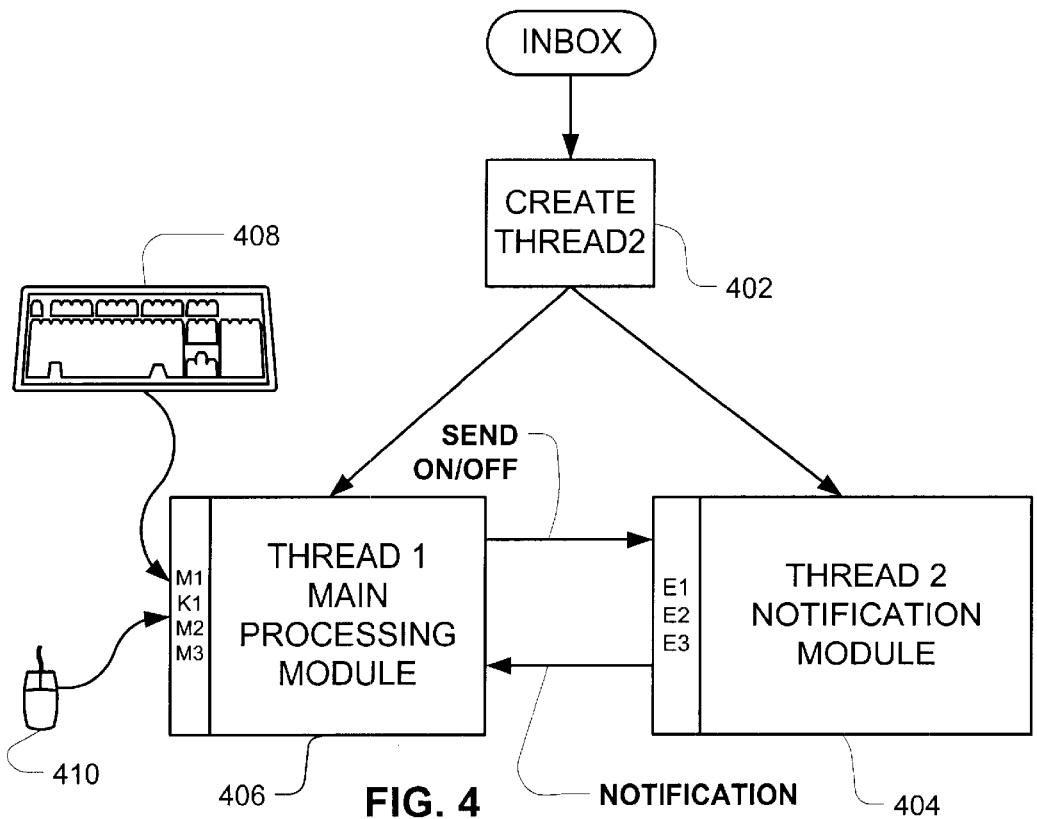
FIG. 4 shows one embodiment of the invention used in an InBox e-mail application to managing the handling of user input along with e-mail messages.

FIG. 4 is an operations flow diagram illustrating one preferred embodiment of the invention where the in-box application creates an additional thread to manage the processing of e-mail notifications. When the in-box application is opened, create operation 402 creates thread 2 for the purpose of receiving the e-mail notifications from the database software. Thread 2 at the notifications module 404 opens the database software to register itself as the recipient of e-mail notification messages. The notification module will queue these notification messages in notification queue 2 for subsequent forwarding to and processing by thread 1. In the meantime, thread 1 continues as main processing module 406. The main processing module handles all of the message events queued in FIFO (first in first out) queue 1 for thread 1 or FIFO queue 2 for thread 2. Queued in user input queue 1 are the mouse and key messages occurring while the application is open. Messages from mouse 408 drive a cursor in the in-box window display area. Key messages are keystrokes from keyboard 410, while the user is working with the application.

Figure 5:
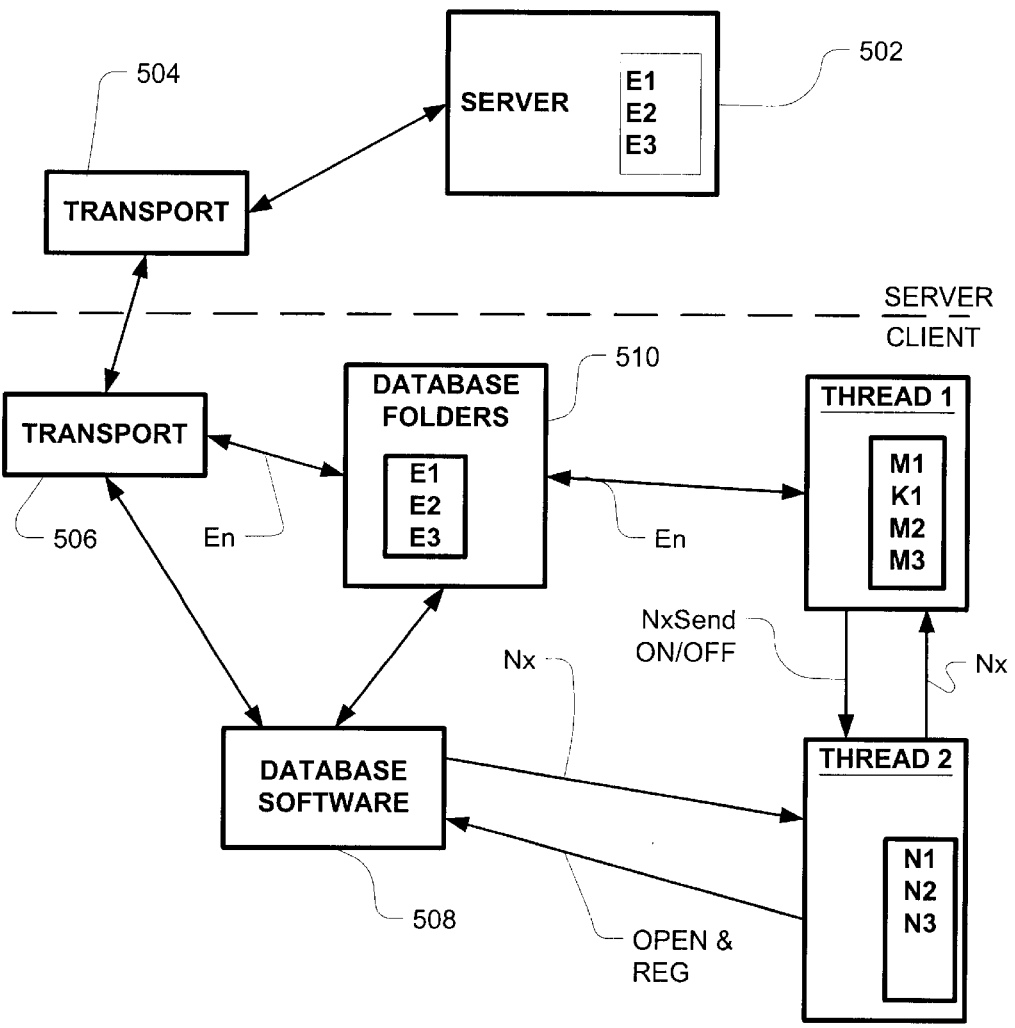
FIG. 5 is a data flow diagram illustrating the flow of data between the server and a client computer operating in accordance with the principles of the invention.

FIG. 5 illustrates the data flow between a server and an in-box application on the handheld computer. The e-mail items E1, E2 and E3 destined for the hand-held computer are transported through transports 504 and 506 which works with the database software 508 to store the e-mail items E1, E2 and E3 in the database folders 510. As just described in FIG. 4, thread 1 of the in-box application creates a thread 2 and then proceeds to process user input and e-mail notifications. When thread 2 is created, it opens the database software and registers itself for receipt of notifications. The notifications are notices of changes in e-mail; in this case, the receipt in the database folders of e-mail messages E1, E2 and E3. Notifications N1, N2 and N3 for these e-mail items are then queued in queue 2 of thread 2. Thread 1 proceeds to process user input mouse messages or keystroke messages until those are handled. At that point, thread 1 toggles the NxSend condition ON for thread 2, and thread 2 forwards notification of e-mail items to thread 1. Thread 1 then works with the database software 508 to handle the e-mail items in the database folders 510. In this manner, the in-box application gives priority to user input and processes e-mail items as processing capacity is available.

In FIG. 4, the e-mail notifications from the database are stored in queue 2 on a first in first out basis by the notification module 404. The main processing module 406 operates to handle the messages in FIFO queue 1 before handling the messages in queue 2. In this manner, the user interface at the in-box application is not locked up or delayed by the in-box receiving a large number of e-mail messages. The main processing of thread 1 controls thread 2 with regard to whether thread 2 forwards a notification from queue 2 to the main processing module. Main processing module 406 will handle each event message in queue 1 before toggling thread 2 to send notification messages to main processing module 406. The notification module 404 in thread 2 is essentially in a wait state accumulating notifications in its queue until it receives an notification send (NxSend) ON signal from thread 1. When the ON signal arrives, thread 2 commences to send notifications for processing to thread 1's main processing module. If another mouse or keystroke message is received in the thread 1 queue, then the NxSend condition at thread 2 is toggled off by the NxSend Off message from thread 1 to thread 2.

Thread 1 and thread 2 have equal access to processing time on the CPU on the handheld computer. However, thread 2 only sends notifications to thread 1 for processing if the NxSend condition has been toggled on by thread 1. Otherwise, thread 2 is simply waiting to send notifications it has accumulated in its FIFO queue 2.

Figure 6:
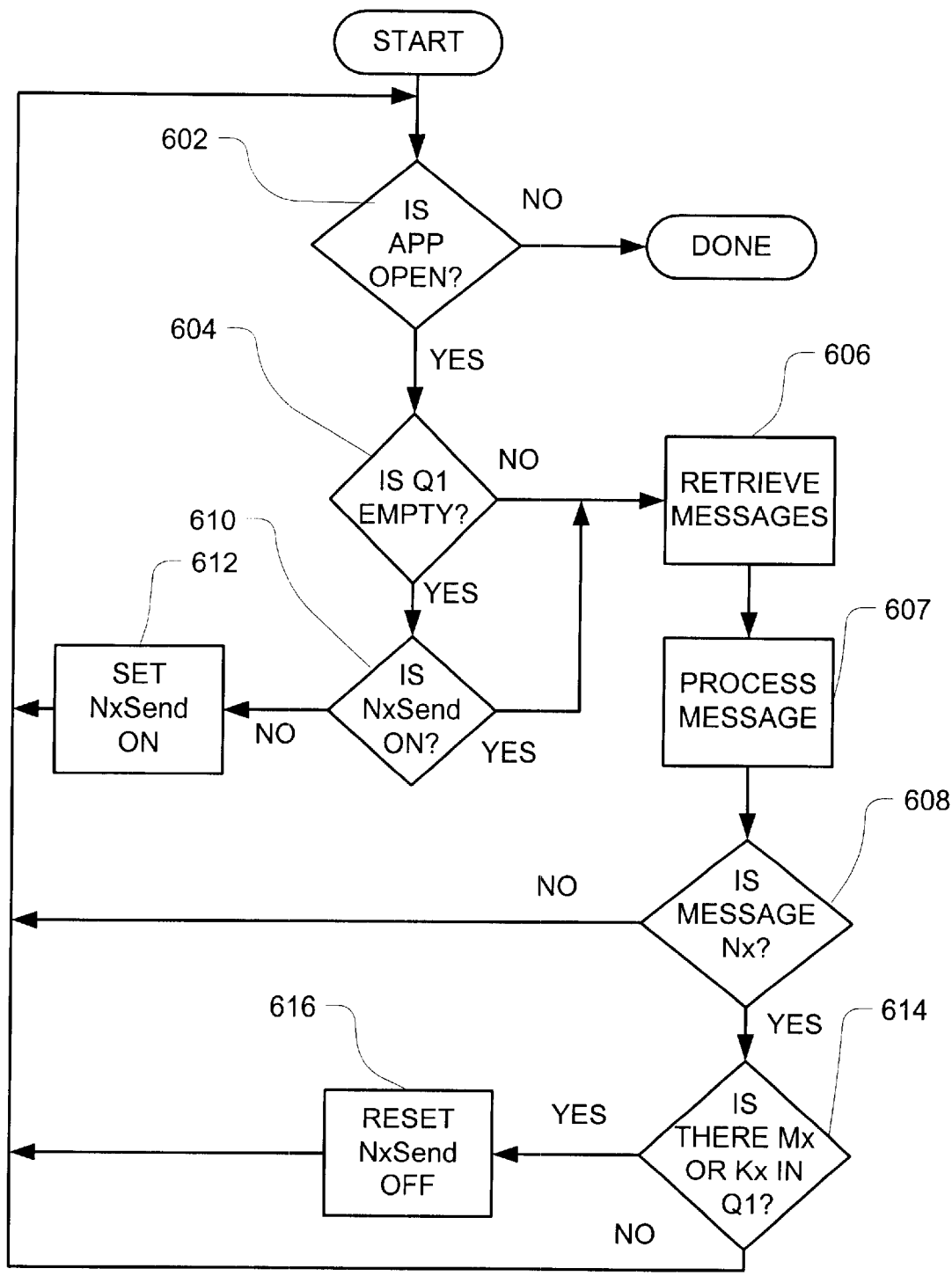
FIG. 6 is an operations flow chart implementing one embodiment of the Main processing module 406 in FIG. 4.

FIG. 6 illustrates the logical operations performed by the main processing module of FIG. 4. Decision operation 602 at the start of the main processing module is checking to see that the in-box application is still open. If the application is still open, then the operation flow branches YES to queue 1 test operation 604. Operation 604 detects whether the thread 1 queue, i.e., queue 1, is empty. If queue 1 is not empty, then there are keystroke messages or mouse messages in queue 1 to be processed. The operation flow branches NO to retrieve module 606. Retrieve module 606 retrieves the first item in user input queue 1 and processes the item. This might be a mouse selection item or a keystroke item. After the mouse message or key message is processed, operation flow passes to decision operation 608. Decision operation 608 is detecting whether the message just processed was a notification message. In effect, decision operation 608 is detecting whether the processed message came from user input queue 1 or notification queue 2. In this instance, the message was from queue 1 so the operation flow branches NO from decision operation 608 and returns to decision operation 602 to detect whether the application is still open.

If the application is still open, then decision operation 604 detects whether user input queue 1 is empty. If user input queue 1 is empty, i.e., all keystroke and mouse messages have been processed, then the operation flow branches YES to see if the notification send (NxSend) condition for thread 2 is ON. If the send condition is not ON, the operation flow branches NO to set operation 612. Set operation 612 sets the NxSend condition to ON. This ON condition is signaled to the notification module 404 (FIG. 4) by the set operation 612. The operation flow then returns to decision operation 602 to again check whether the application is still open. If the application remains open, queue 1 is still empty and NxSend is now ON, the operation flow passes through decision operations 602, 604 and 610 to the retrieve module 606.

Retrieve module 606 retrieves a notification message from notification module 404. Process module 607 processes the notification message. The notification message indicates that an e-mail item is in the database folders, and process module 607 will display that e-mail item on the output device, so it is available for manipulation by the user.

After the notification message is retrieved and processed, decision operation 608 tests whether the message was a notification message. Since the processed message was a notification message, the operation flow branches YES from decision operation 608 to user input queue test module 614. Test module 614 is checking to see whether there is a mouse/key message again in queue 1. A message in queue 1, in accordance with the principles of this invention, will be processed in a higher priority than the notification messages. Accordingly, if test module 614 detects a message in queue 1, the operation flow branches YES to reset operation 616. Reset operation 616 resets the NxSend condition or, in other words, turns off the notification send message. The reset operation 616 sends this NxSend OFF signal to the notification module. The operation flow then returns to decision operation 602 to check to see that the in-box application is still open.

If user input queue test module 614 detects there is no message in queue 1 indicating there is no mouse or keystroke message to be processed, the operation flow branches NO from test module 614 and returns to decision operation 602. Decision operation 602, if the application is still open, passes the operation flow through decision operations 604 and 610 to retrieve the next notification message in operation 606. If the user has closed the application, then the operation flow branches NO from decision operation 602 and exits the main thread, thread 1, and the in-box application.

Figure 7:
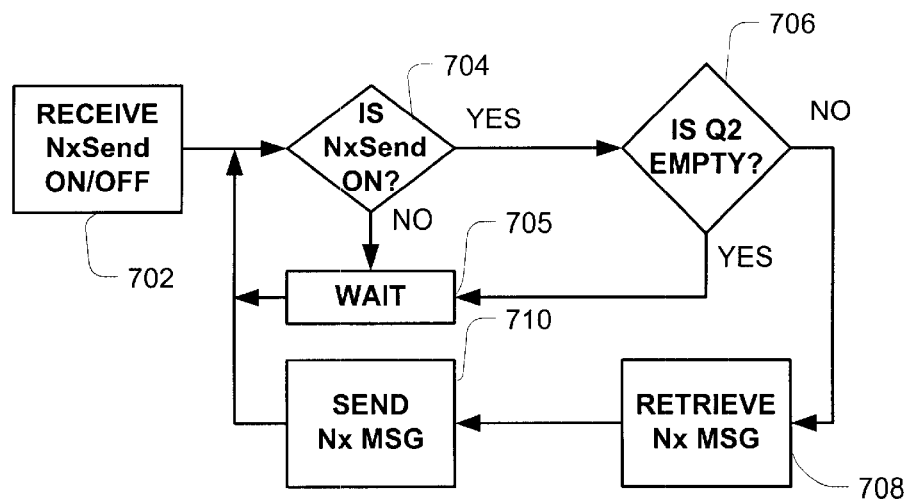
FIG. 7 is an operations flow chart implementing one embodiment of the notification module 408 in FIG. 4.

FIG. 7 illustrates the logical operations performed by the notification module 404 of FIG. 4. Monitor operation 702 monitors the NxSend ON/OFF signal from thread 1. NxSend condition detection operation 704 detects whether the NxSend signal indicates an ON or OFF condition for sending notifications to main thread 1. If the NxSend condition is OFF, the operation flow loops through a wait state back to NxSend condition detection operation 704 and continues to test for the NxSend condition from thread 1.

If operation 704 detects that the NxSend condition is ON, then operation flow branches yes to notification queue test operation 706. Notification queue test operation is checking for notification messages in queue 2. If queue 2 is empty, the operation flow branches YES back to check the NxSend condition in test operation 704. As long as the NxSend condition is ON, and queue 2 is empty, the operation flow would stay in this loop between test operation 704 and notification queue test operation 706. When a notification message is in queue 2, then the operation flow would branch NO from notification queue test operation 706 to retrieve Nx message module 708.

At retrieve Nx message module 708, the Nx message next in line in FIFO queue 2 is retrieved. Send operation 710 then sends this notification message to main processing module 406 (FIG. 4) in thread 1. So long as the NxSend condition is ON, and there are notification messages in queue 2, then the operation flow will continue to retrieve notification messages in operation 708 and send them to thread 1 in send operation 710.

The operations described in FIGS. 4–7 have been in the context of a mail handling application working with e-mail items. It will be appreciated by one skilled in the art that any server-based item to be passed to an application in a client computer could be handled in the same way as described for FIGS. 4–7. Some server-based items could include calendar events, tasks, account records, notes, or any other information to be processed between server and client. As described above, the preferred embodiments of the invention permit any application which is receiving items from a server to manage user input and the receipt of those items in such a manner that user input is processed at a higher priority than the receipt of the server based items.

It will, of course, be understood that various modifications and additions can be made to the embodiments discussed hereinabove without departing from the scope or spirit of the present invention. For example, the present invention rather than being embodied in an application program may be integrated in an operating system such as Microsoft Corporation's "WINDOWS CE", or may be implemented in other operating systems or application software such as an e-mail software module. While many embodiments of the invention were described in terms of managing e-mail messages and user input messages, the invention is not limited to such, managing such a specific collection of messages. Managing of information for priority processing can be accomplished using the principles of the present invention. Accordingly, the scope of the present invention should not be limited by the particular embodiments discussed above, but should be defined only by the claims set forth below and equivalents thereof.

I claim:

1. A computer program storage medium readable by a computing system and encoding a computer program of instructions for executing a computer process in a client computer, the computer process managing the priority of handling user input messages and server-based item messages from a server computer, the computer process comprising:

opening a first thread for processing user input messages and server-based item messages, the first thread having a user input queue for user input messages;

opening a second thread for holding server-based items for processing by the first thread, the second thread having a item queue for server-based item messages;

retrieving for the first thread user input messages from the user input queue until the user input queue is empty;

setting a send condition to ON when the user input queue is empty;

resetting the send condition to OFF when the user input queue is not empty;

sending a server-based item message from the item queue in the second thread to the first thread when the send condition is ON; and processing in the first thread the user input messages from the user input queue and the server-based item messages from the item queue whereby the user input messages are processed before the server-based item messages are processed.

2. The computer program storage medium of claim 1 wherein the computer process further comprises:

detecting whether the user input queue is empty; and testing the send condition to determine whether the send condition is ON or OFF.

3. The computer program storage medium of claim 2 wherein the sending operation in the computer process comprises:

checking whether the item queue is empty;

retrieving a server-based item message from the item queue; and sending the server-based item message from the item queue to the first thread for processing.

4. The computer program storage medium of claim 3 wherein the client computer is a handheld computer and the server-based items are e-mail messages.

5. The computer program storage medium of claim 4 wherein the user input messages are cursor control messages and keystroke messages.

6. Apparatus for preventing a perception to a user of slow processing or system lockout by a client computer due to extended delay in processing a local item while the client computer processes a server-based item, said apparatus comprising:

a notification module having a server-based item notification queue storing notices of changes in server-based items awaiting processing;

a main processing module processing local items and toggling ON/OFF a notification send signal to the notification module, the notification send signal toggled ON when all local items have been processed and toggled OFF when local items are waiting to be processed; and said notification module sending notification messages to the main processing module for processing when the notification send signal is toggled ON and storing notices of changes in the notification queue when the notification send signal is toggled OFF.

7. The apparatus of claim 6 wherein the main processing module further comprises:

local item test module detecting whether there are local items to be processed;

set module setting the notification send signal ON when there are no local items to be processed; and reset module resetting the notification send signal OFF when there are local items to be processed.

8. The apparatus of claim 7 where said notification module further comprises:

a notification queue test module checking for notices of changes in the notification queue;

a notification send detection module detecting whether the notification send signal is set ON or reset OFF; and a send module sending notifications to the main processing module when the notification test module indicates notices of changes are in the notification queue and the notification send detection operation detects the notification send signal is set ON.

9. The apparatus of claim 8 wherein the client computer is a handheld computer.

10. The apparatus of claim 9 wherein the local items are user input messages to the handheld computer.

11. The apparatus of claim 10 wherein the server-based items are information messages to be sent to the handheld computer from the server.

12. A computer data signal embodied in a carrier wave readable by a computing system and encoding a computer program of instructions to execute a computer process for controlling the priority of processing of first and second messages in a client computer, the computer process comprising:

establishing first and second queues for the first and second messages respectively;

holding in the second queue the second messages until a retrieve condition is toggled ON;

toggling the retrieve condition ON and OFF depending on whether the first queue is empty or not empty, respectively; and processing first messages from the first queue and second messages from the second queue depending upon whether the retrieve condition is OFF or ON, respectively.

13. The computer data signal of claim 12 wherein the first messages are user input messages to the client computer and the second messages are e-mail notification messages indicative of changes in e-mail at the data store in the client computer.

14. The computer data signal of claim 13 wherein the toggling operation of the computer process comprises:

detecting whether the first queue contains a user input message;

setting the retrieve condition ON if the first queue does not contain a user input message; and resetting the retrieve condition OFF if the first queue does contain a user input message.

15. The computer data signal of claim 12 wherein the establishing operation comprises:

starting a first thread for processing the user input and e-mail notification messages;

creating a second thread for registering with the data store to receive from the data store the e-mail notification messages.

16. The computer data signal of claim 15 wherein the holding operation comprises:

detecting whether the retrieve condition is ON or OFF;

detecting whether the second queue contains an e-mail notification message; and retrieving for processing a e-mail notification message from the second queue if the retrieve condition is ON and the second queue contains e-mail notification messages.

17. The computer data signal of claim 12 wherein the client computer is a handheld computer.

18. A method for managing in a main processing thread in a handheld computer processing user input messages and e-mail messages, said method comprising:

creating a second thread from the main, the main thread having a user input queue for user input messages and the second thread having a notification queue for e-mail notification messages;

processing user input messages in the user input queue until the user input queue is empty;

sending a first notification send signal from the main thread to the second thread after the user input queue is empty, the first notification send signal indicating when the main thread is available to process e-mail notification messages; and retrieving and processing at the main thread e-mail notification messages sent from the second thread after the notification send signal has been sent from the main thread until the user input queue is no longer empty.

19. The method of claim 1 further comprising:

sending a second notification signal from the main thread to the second thread when the user input queue is no longer empty; and retrieving and processing at the main thread user input from the user input queue after the second notification send signal has been sent from the main thread and until the user input queue is empty.

20. The method of claim 19 wherein the user input messages are key messages and mouse messages.

21. The method of claim 19 further comprising:

receiving a first notification send signal from the first thread at the second thread;

testing whether the notification queue is empty; and sending e-mail notification messages from the second thread to the first thread if the notification queue is not empty when a first notification send signal is received.

* * * * *